United States Patent [19]

Eder et al.

[11] Patent Number: 4,679,175
[45] Date of Patent: Jul. 7, 1987

[54] ULTRASONIC DISTANCE SENSOR WITH DUAL BURST NOISE REJECTION

[75] Inventors: Kenneth C. Eder, New Brighton; Robert V. Krzyanowski, Plymouth, both of Minn.

[73] Assignee: Honeywell Inc., Minneapolis, Minn.

[21] Appl. No.: 681,163

[22] Filed: Dec. 13, 1984

[51] Int. Cl.[4] ............................ G01S 9/66; G01S 9/68
[52] U.S. Cl. ........................................ 367/98; 367/95; 367/99; 367/105; 367/902; 367/151
[58] Field of Search ................. 367/95, 105, 112, 151, 367/97–99, 902

[56] References Cited

U.S. PATENT DOCUMENTS

| | | | |
|---|---|---|---|
| 3,454,922 | 7/1969 | Dory | 367/97 |
| 4,358,835 | 11/1982 | Fage | 367/151 |
| 4,380,807 | 4/1983 | Reynard | 367/97 |
| 4,464,738 | 8/1984 | Czajkowski | 367/112 |
| 4,549,286 | 10/1985 | Langeraar et al. | 367/97 |

FOREIGN PATENT DOCUMENTS 0077679  5/1983  Japan ................................ 367/99

OTHER PUBLICATIONS

Honeywell Micro Switch Product Literature Gerate-Information E101 for Serien 941 and 942 Ultraschall-Abstandssensoren Microsonic (3-84).

*Primary Examiner*—Thomas H. Tarcza
*Assistant Examiner*—Daniel T. Pihulic
*Attorney, Agent, or Firm*—Charles L. Rubow

[57] ABSTRACT

An ultrasonic distance sensing method and apparatus are disclosed in which a transducer periodically transmits a pair of bursts of acoustic energy along an acoustic path toward a target object, an echo of the first acoustic burst in each burst pair is used to establish a peak reference level, and an echo of the second burst in each pair is used to determine distance to the target object only if its level exceeds a predetermined fraction of the peak reference level.

13 Claims, 7 Drawing Figures

ULTRASONIC DISTANCE SENSOR WITH DUAL BURST NOISE REJECTION

BACKGROUND OF THE INVENTION

The invention disclosed herein relates generally to ultrasonic sensors, and more specifically to single transducer, pulse transmission ultrasonic range finders with enhanced noise rejection capabilities.

It is well-known to detect the presence of and/or determine the distance to a target object by transmitting acoustic energy toward the object, receiving reflections of the transmitted acoustic energy from the object and computing distance based on round trip travel time and the propogation speed of the acoustic energy. Sensors employing this approach are being used to an increasing extent in a variety of industrial and other applications. Some characteristics which make acoustic sensors particularly desirable in industrial settings are ability to sense presence without physical contact, relative insensitivity to dust, smoke, moisture and other contaminants in the target area, and minimum likelihood of contributing to explosions in explosive environments.

However, it is also well-known that industrial settings provide particularly severe acoustic noise conditions for operation of acoustic sensors. There may be high noise intensities and large variations in both intensity and frequency content, depending on the application and setting. Since the distance sensing ability of a pulse transmission acoustic sensor is dependent on accurate detection of the arrival time of an echo, the sensor must be able to reject environmental noise which distorts the received echo.

A variety of methods and apparatus have been used to improve the ability of acoustic sensors to operate reliably under acoustically noisy conditions. These include various types of filters and filtering techniques and a number of other approaches to the problem. For example, U.S. Pat. No. 3,454,922 issued to J. Dory on July 8, 1969 discloses ultrasonic pulse distance measuring device in which a peak detector and a threshold unit are used to accurately determine time of arrival of the leading edge of an echo pulse. Operation under noisy conditions can also be improved by establishing a detection window around the expected arrival time of an echo pulse.

The applicants have devised a single transducer, pulse transmission, ultrasonic sensor employing a unique method and arrangement of components for achieving enhanced ability to operate reliably in acoustically noisy environments. The sensor is of a relatively simple, compact design and is capable of good distance sensing accuracy and operational flexibility.

SUMMARY OF THE INVENTION

The present invention is a single transducer, pulse transmission, ultrasonic range finding method and apparatus which employs periodic pairs of acoustic bursts to achieve an enhanced noise rejection. Apparatus according to the invention basically comprises a transducer and transmit/receive circuitry operable to cause the transducer to transmit first and second bursts of acoustic energy and receive echoes thereof from the target object. A peak detector in the receiver circuitry operates to establish a peak reference level in response to the echo resulting from the first burst in each pair. A comparator then operates to pass the echo of the second burst in each pair only if it exceeds a predetermined fraction of the peak reference level. An averaging detector may also be included to establish an average reference level in response to electrical signals produced by the transducer, the comparator being operable to pass the echo signals only if they exceed the average reference level. The electrical signals resulting from receipt of echoes of the second burst are used to determine distance to the target.

The method of the present invention basically comprises the steps of transmitting periodic first and second bursts of acoustic energy toward a target object and receiving echos thereof, establishing a peak reference level based on the level of the first echo, and using the second echo to determine distance to the target only if its levels exceeds a predetermined fraction of the peak reference level. An average level may also be established based on the average level of the echo signals, and the echo of the second burst in each pair used to determine distance only if it exceeds an average reference level.

DESCRIPTION OF THE PREFERRED EMBODIMENT

Figure 1:
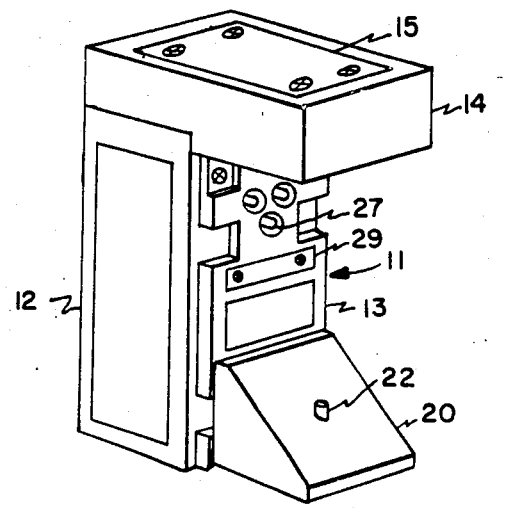
FIG. 1 is a perspective external view of an ultrasonic sensor in accordance with the present invention.

In the pictorial view of FIG. 1, reference numeral 11 generally identifies a housing for an ultrasonic sensor in accordance with the applicants' invention. Housing 11 comprises a hollow body 12 with a cover plate 13 which together form a compartment for electronic signal processing circuitry employed in the sensor. Housing 11 also includes a head 14 mounted on one end of the body, the head including a projecting portion which extends beyond the edge of the body, and a cover 15.

Figure 2:
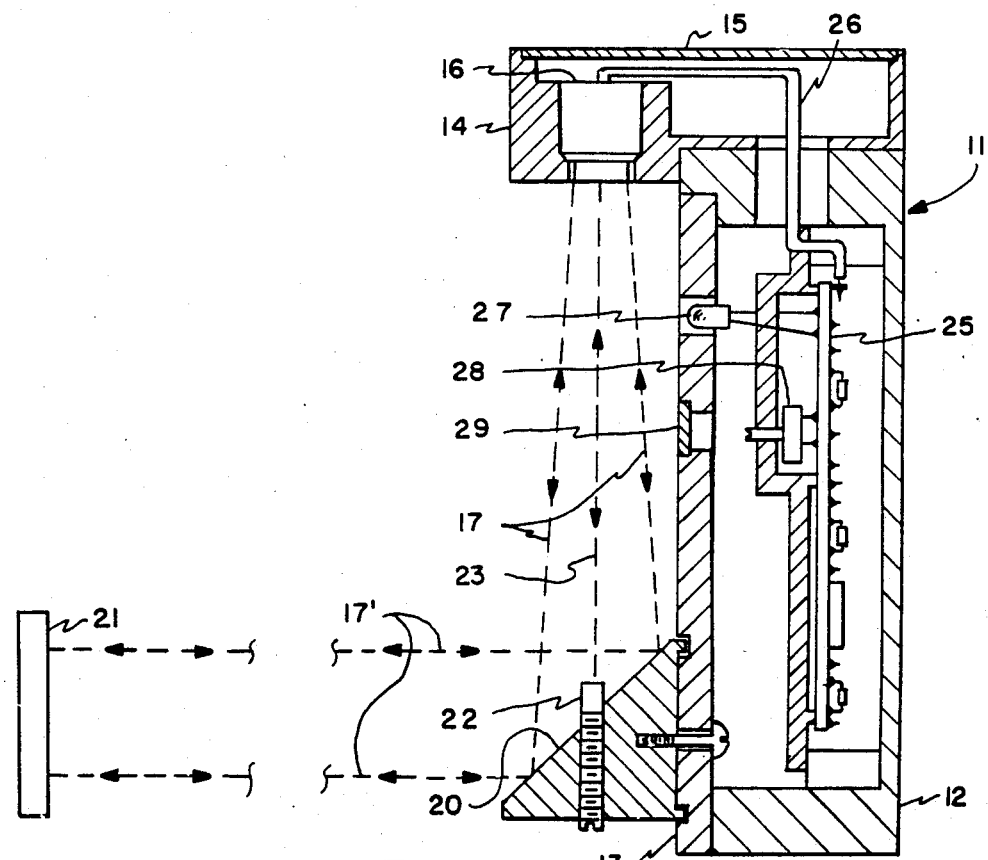
FIG. 2 is an enlarged sectional side view of the sensor of FIG. 1.

As shown on FIG. 2, an electroacoustic transducer 16 is mounted in the projecting portion of head 14, and is directed to transmit and receive acoustic energy along a path beside body 12 as indicated by dashed lines 17. A reflector 20 is mounted on cover 13 near the end of body 12 opposite the end on which head 14 is mounted. Reflector 20 is positioned to intercept and redirect acoustic energy transmitted and received by transducer 16 along a path indicated by dashed lines 17'. The path indicated by lines 17' leads to a target area in which is located a target object 21.

Reflector 20 includes a reference target 22 having a face directed toward transducer 16. As shown, reference target 22 comprises a threaded stud in the main portion of reflector 20 and extending in the direction of transducer 16. The face of reference target 22 is at a predetermined distance from the face of transducer 16. The spacing between reference target 22 and transducer 16 can be set as necessary by means of the screw threads. A portion of the acoustic energy transmitted by transducer 16 impinges on reference target 22 and is reflected therefrom back to the transducer as indicated by dashed line 23.

Reference numeral 25 identifies a printed circuit board carrying the electronic drive and signal processing circuitry for transducer 16. Such circuitry may be implemented with integrated circuit oscillators, receivers, counters and logic gates for timing the bursts of acoustic energy transmitted by transducer 16 and processing the reflections of the bursts of acoustic energy received thereby to determine distance between reflector 20 and target 21. Alternatively, the timing and signal processing may be done with a programmed microprocessor.

Circuit board 25 is shown connected to transducer 16 by means of a cable 26 and is also connected to indicator lamps, such as lamp 27, visible through holes in cover 13. Circuit board 25 is also connected to certain adjustment devices, such as device 28, to which access can be gained through a port in cover 13 under a cover plate 29.

Figure 3:
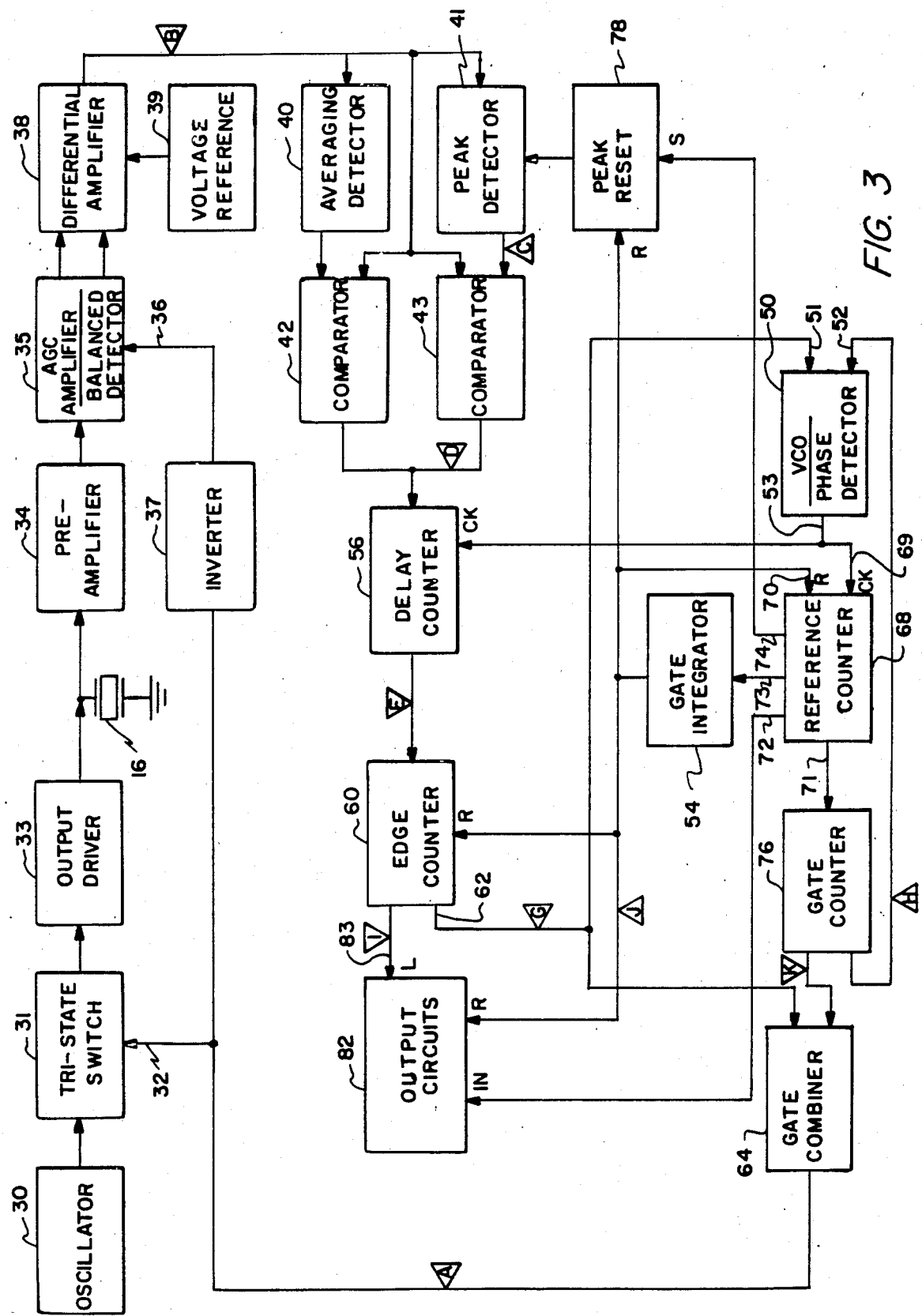
FIG. 3 is a block diagram of preferred transmit/receive circuitry for an ultrasonic sensor in accordance with the present invention.

Transmit/receive circuitry suitable for driving transducer 16 and receiving and processing signals therefrom is shown in block diagram form in FIG. 3. The general form and timing of signals at various points identified by letters enclosed in triangles in FIG. 3, and FIG. 4 discussed hereinafter, are shown in FIG. 5 where the waveforms are identified by corresponding letters.

In FIG. 3 reference numeral 30 identifies an oscillator which produces a carrier signal having a frequency chosen to correspond to the resonant frequency of transducer 16. The output signal of oscillator 30 is supplied to switching means 31 which has a control terminal 32 connected to receive a signal (first pulse in waveform A) which will be discussed hereinafter. The output signal of switching means 31 is supplied to an output driver 33 which produces the drive signal for transducer 16, the transducer being adapted to alternately transmit and receive acoustic energy.

Acoustic energy received by transducer 16 is converted into electrical signals which are supplied through a preamplifier 34 to a balanced detector 35 comprising an AM receiver whose gain is controllable by a signal at gain control terminal means 36. The signal supplied to control terminal 32 of switching means 31 is also supplied through an inverter 37 to gain control terminal means 36 so as to substantially reduce the gain of detector 35 during the intervals transducer 16 is being caused to transmit acoustic energy.

The output signals of detector 35 are supplied to differential amplifier means 38 which also receives a reference voltage from a voltage reference circuit 39. The reference voltage establishes a noise floor. If the signals produced by detector 35 exceed the level of the noise floor, amplifier means 38 passes the signals (waveform B) to an averaging detector 40 and a peak detector 41 which, in conjunction with comparators 42 and 43 respectively, perform further tests for signal validity. More specifically, comparators 42 and 43 compare the output signal of amplifier means 38 with the output signals of averaging detector 40 and peak detector 41 (waveform C) respectively.

Timing signals for the remainder of the circuitry shown in FIG. 3 originate from a voltage controlled oscillator and phase detector 50 having a pair of input terminals 51 and 52. Oscillator 50 is set to normally produce a predetermined frequency at an output terminal 53. However, the output frequency is variable depending on the relative phases of signals supplied to input terminals 51 and 52. This frequency shifting capability is utilized as will be described hereinafter to compensate for variations in acoustic propagation velocity in the environment surrounding transducer 16 due to variations in environmental parameters such as temperature, pressure and humidity.

In operation, the circuitry illustrated in FIG. 3 is initialized and reset as necessary thereafter by a gate integrator 54. Initially, a signal is supplied to control terminal 32 of switching means 31 to cause transducer 16 to transmit a burst of acoustic energy. The transmitted burst is of a predetermined duration, e.g., 50 microseconds. This initial burst of acoustic energy first impinges on reference target 22, and a portion is returned to transducer 16. Assuming that the corresponding electrical signal from transducer 16 exceeds the noise floor and passes the test provided by detector 40 and comparator 42, a delay counter 56 is enabled. Delay counter 56 receives its clock signals from oscillator 50, and is set to provide an output signal (waveform E) if the acoustic return signal has a duration at least as long as the transmitted signal. This comprises a further test to distinguish valid acoustic return signals from noise.

The output signal of delay counter 56 is supplied to an edge counter or decoder 60 having a first output terminal 62 on which is produced a pulse signal (waveform G). The output signal on terminal 62 is supplied to a gate combiner 64 which supplies a resultant pulse signal (second pulse in waveform A) to control terminal 32 of switching means 31 to cause transducer 16 to transmit a second burst of acoustic energy in a burst pair.

The signal on output terminal 62 of edge counter 60 also comprises the input signal on input terminal 51 of oscillator 50. The input signal on input terminal 52 (waveform H) is derived from a reference counter 68 having a clock terminal 69, a reset terminal 70 and a plurality of output terminals 71-74. The signal on terminal 71 is supplied to a gate counter 76 having a first output terminal connected to second input terminal 52 of oscillator 50 and a second output terminal connected to a second input terminal of gate combiner 64. Gate counter 76 supplies a signal to input terminal 52 of oscillator 50 after an interval equal to the sum of the normal round trip transit time of an acoustic signal between transducer 16 and the reference target plus the delay introduced by counter 56. The signals at input terminals 51 and 52 occur simultaneously if the oscillator is operating at the correct frequency. In the event that the signals do not occur simultaneously oscillator 50 functions to shift the frequency on output terminal 53 to bring the signals on input terminals 51 and 52 into coincidence.

Return of the echo of the first acoustic burst from the target object at a normal distance from the range finder occurs significantly after return of the echo of the second acoustic burst from the reference target. The echo of the first acoustic burst from the target object, provided it is at a higher level than the noise floor, is used to set the level in peak detector 41 whose operation is controlled by a signal from a peak reset circuit 78 which receives set and reset signals from output terminal 74 of reference counter 68 and gate intergrator 54 respectively. Return of the echo of the second acoustic burst from the target object is determined to be valid if it exceeds the noise floor level, an average level established by averaging detector 40 and a predetermined fraction of the peak level for at least the duration determined by delay counter 56. If these tests are met, delay counter 56 increments edge counter 60 which supplies a signal (waveform I) to output circuits 82 through a latch input terminal 83.

If the target object is within a normal range of distances from the range finder, the output circuits, which have accumulated a count from output terminal 72 of reference counter 68, indicate distance to the target object. However, if the target object is too close to provide for distance detection (i.e., target echoes are received within an interval shorter than twice the time required to receive both reference target echoes), output circuits 82 indicate only that a target object is present.

Since reference counter 68 is clocked by oscillator 50 whose frequency is shifted in accordance with the actual time required for acoustic energy to travel to and from the reference target whose spacing from the transducer is known, compensation is automatically provided for variations in acoustic propogation speed between the range finder and target object.

Reference counter 68 supplies a pulse signal on output terminal 73 at a time corresponding to a distance slightly greater than the maximum operating range of the range finder. This causes gate integrator 54 to produce a reset signal (first and last pulses in waveform J) which resets the range finder for a new cycle. A predetermined time interval thereafter (e.g., 50 microseconds) reference counter 68 supplies a pulse signal on output terminal 71 which causes gate counter 76 and gate combiner 64 to initiate transmission of the first acoustic burst in a new burst pair.

Figure 4A:
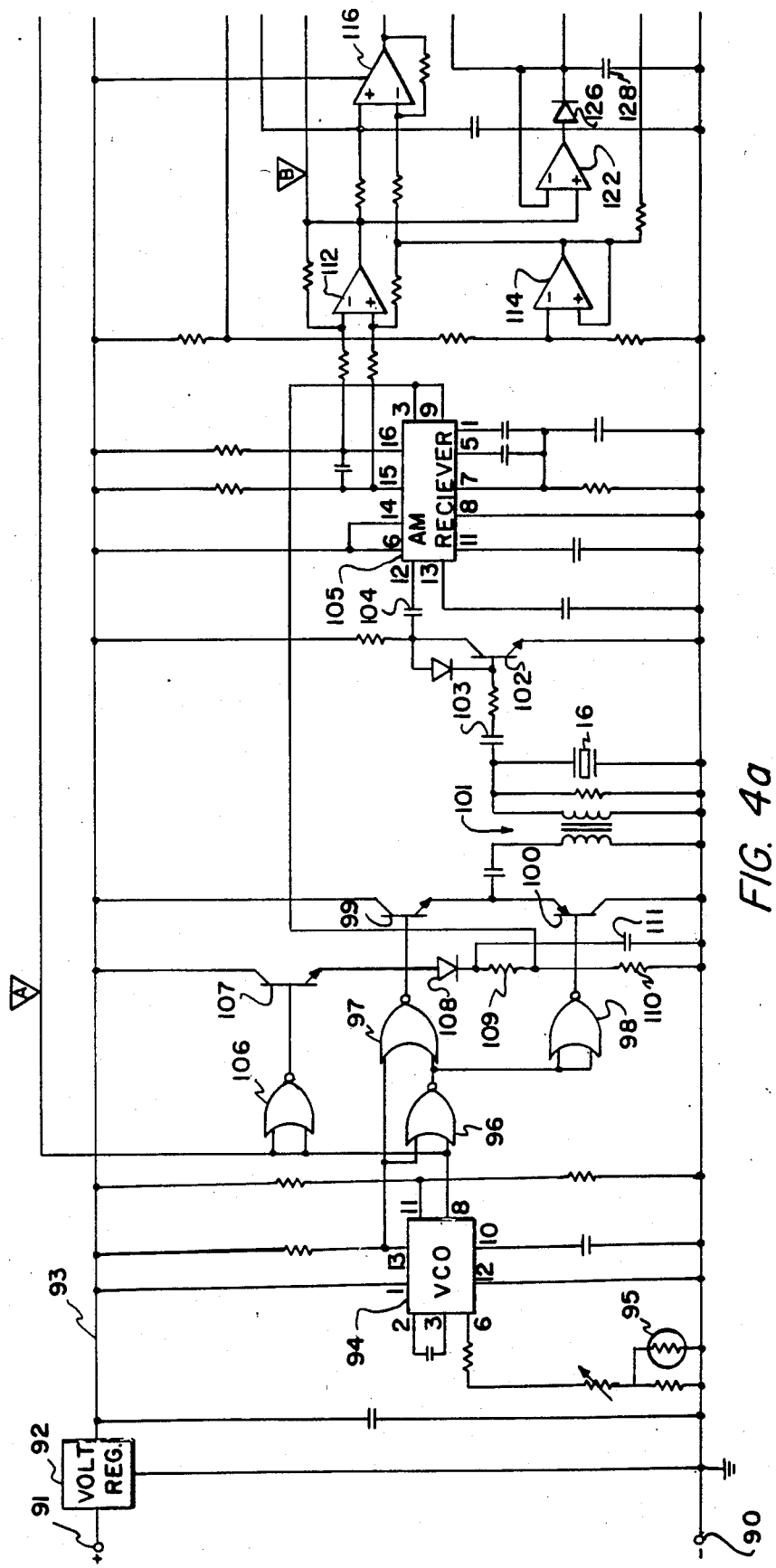
FIGS. 4a, 4b and 4c together comprise a schematic circuit diagram of transmit/receive circuitry corresponding to the block diagram of FIG. 3.
Figure 4B:
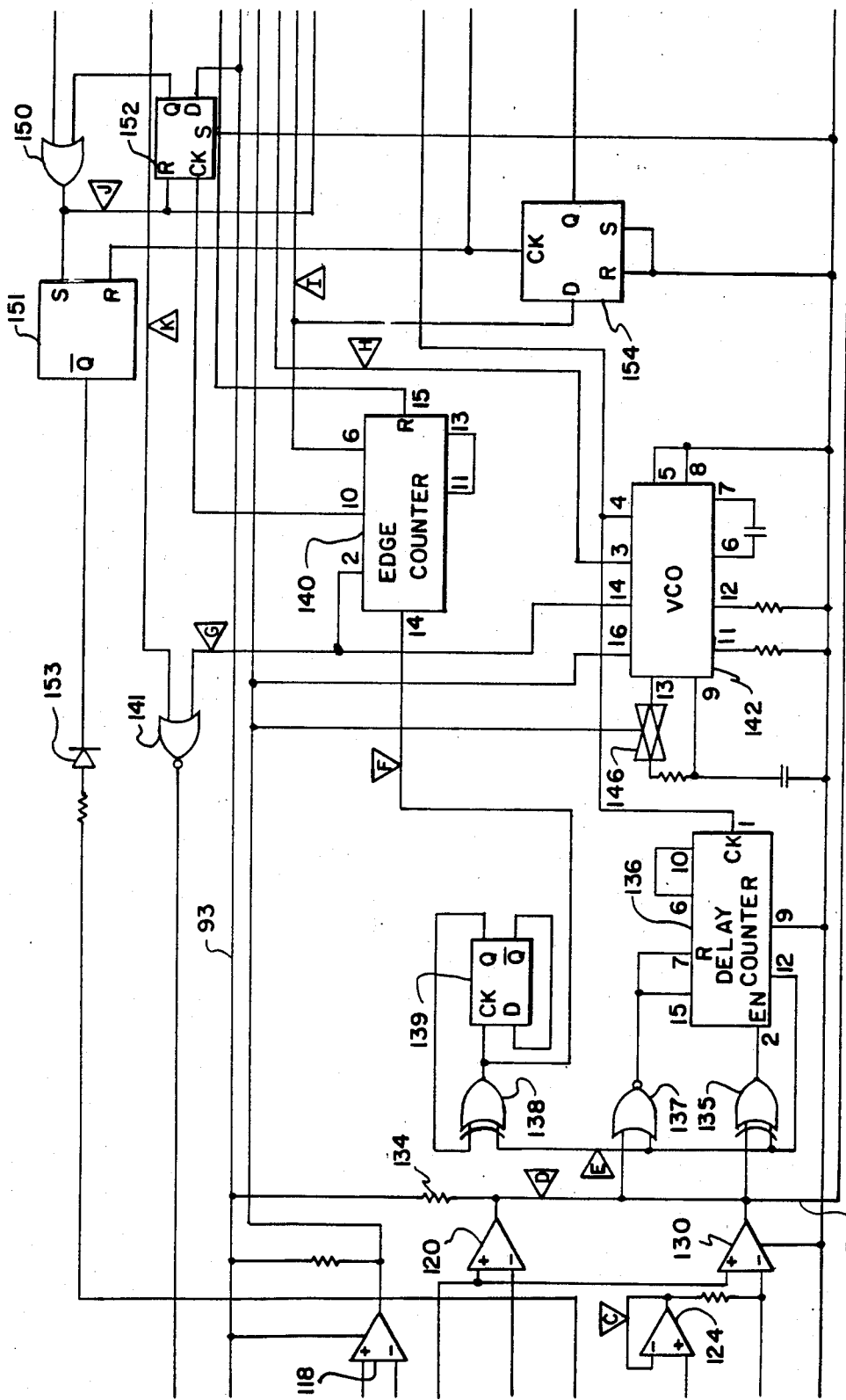
Figure 4C:
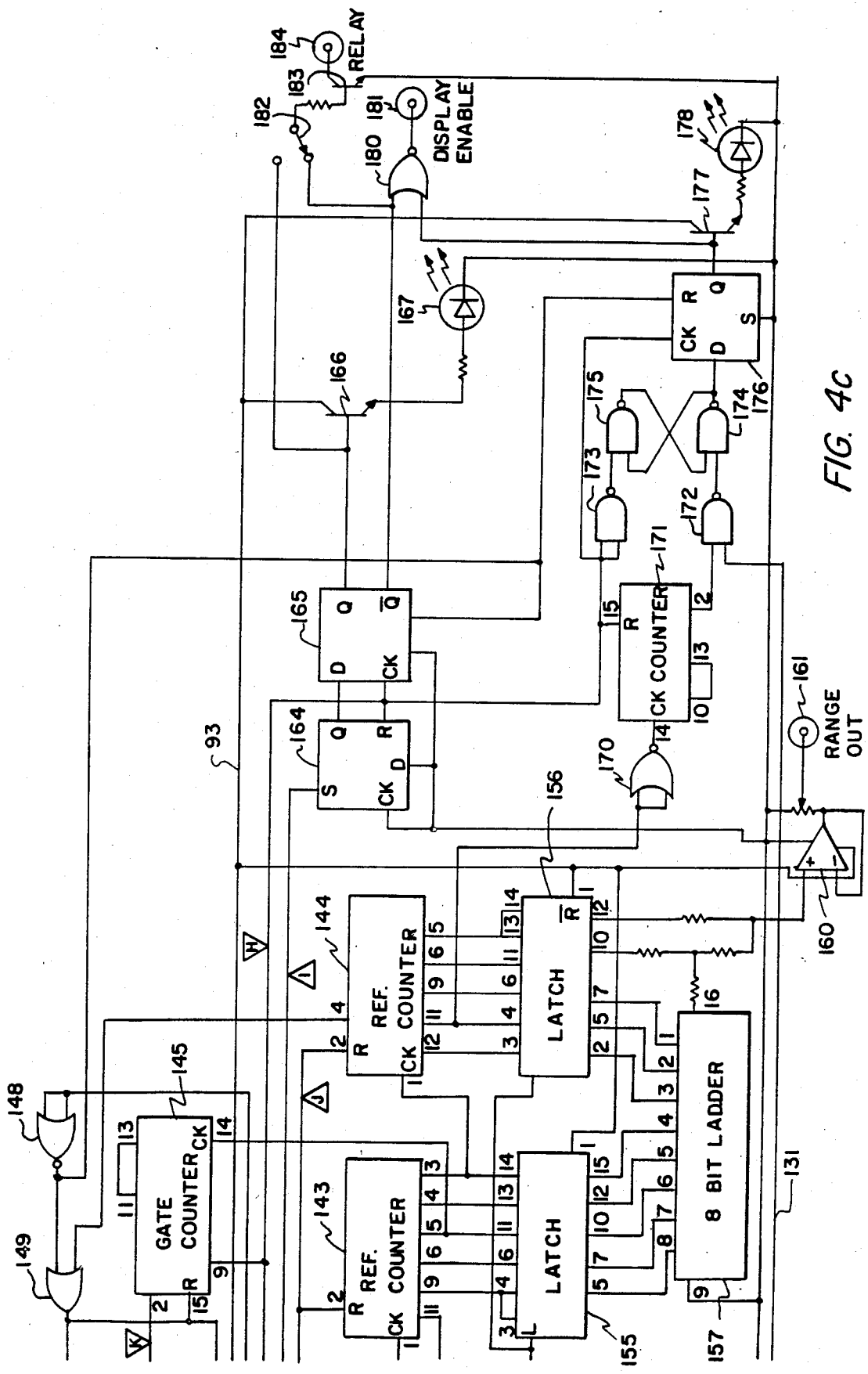
Figure 5:
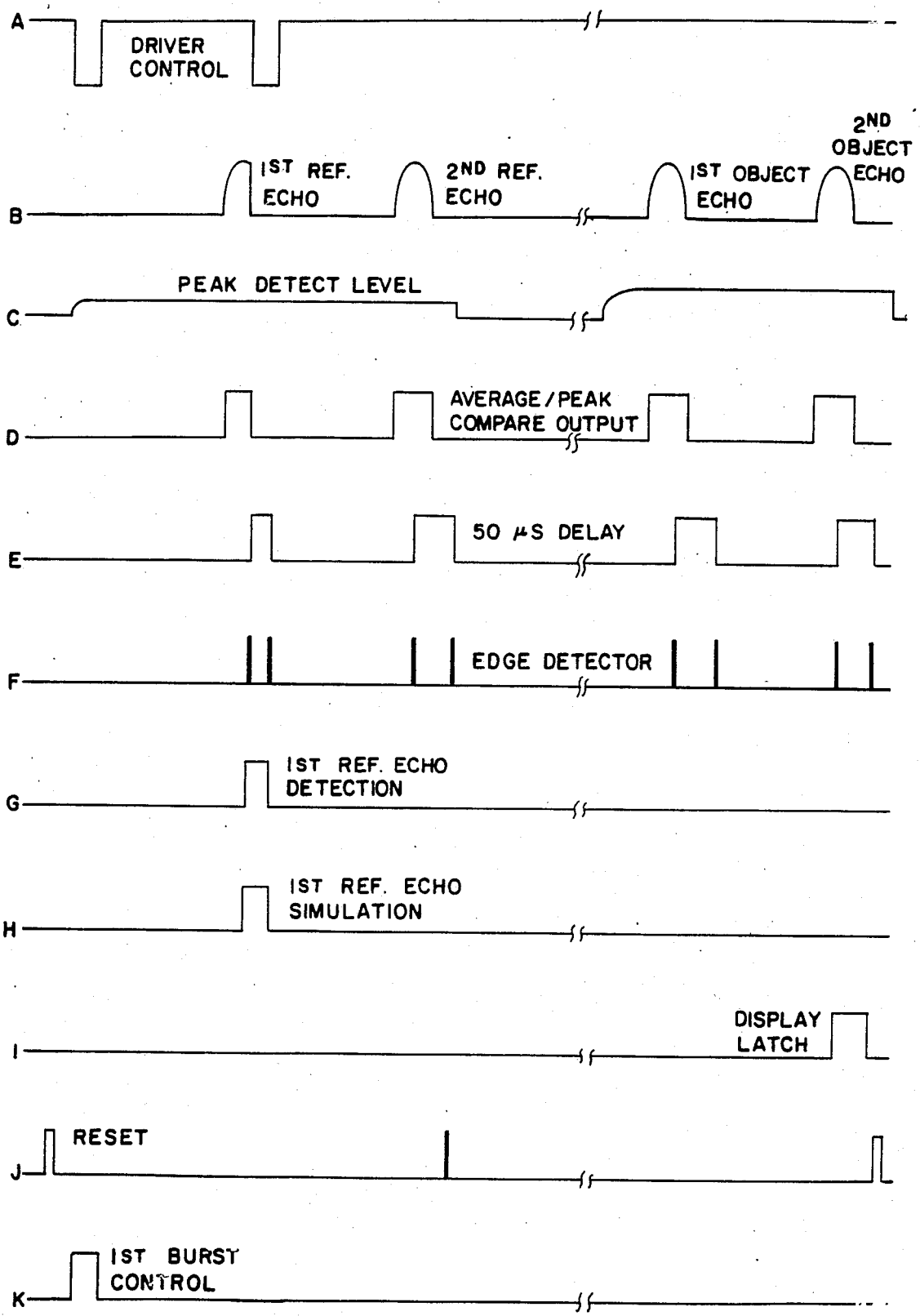
FIG. 5 illustrates the general form and timing of signals at various points in the circuit of FIGS. 3 and 4.

A specific circuit for carrying out the functions described in connection with the block diagram of FIG. 3 is shown in FIG. 4. A DC supply voltage (e.g., from 15 to 30 volts) is applied between a negative supply terminal 90 on a reference or ground bus and a positive supply terminal 91. The positive voltage is reduced to 12 volts DC by a voltage regulator 92 and supplied over a positive voltage bus 93 to other components in the transmit/receive circuitry, as required.

Reference numeral 94 identifies an integrated circuit voltage controlled oscillator whose pin 6 is connected to ground through a resistor network including a thermister or other temperature dependent resistance element 95. Oscillator 94 is set to provide a carrier frequency equal to the resonant frequency of transducer 16, which, in a specific embodiment, was nominally 220 kHz. Element 95 causes the output frequency of oscillator 94 to track the resonant frequency of transducer 16 as the resonant frequency varies with temperature. Oscillator 94 may comprise a model XR-2207 voltage controlled oscillator commercially available from the EXAR Integrated Circuit Corporation.

Oscillator 94 produces a square wave output signal between pins 8 and 13 which are connected to a tri-state switch comprising NOR gates 96, 97 and 98. Specifically, pins 8 and 13 are connected to the input terminals of NOR gate 96 whose output terminal is connected to one input terminal of NOR gate 97 and both input terminals of NOR gate 98. A second input terminal of NOR gate 97 is connected to pin 13 of oscillator 94. The input terminal of NOR gate 96 connected to pin 8 of oscillator 94 is also connected to a gate combiner circuit which will be described in greater detail hereinafter. The gate combiner circuit produces a negative going pulse signal of predetermined pulse duration, e.g., 50 microseconds (waveform A) which enables the tri-state switch so that NOR gates 97 and 98 produce bipolar bursts of carrier frequency relative to a fixed reference.

The output signals of gates 97 and 98 are supplied to the base electrodes of a pair of complimentary driver transistors 99 and 100 respectively, which provide a drive signal to one winding of a transformer 101 through a capacitor, the other winding of the transformer producing the drive signal for transducer 16. Transducer 16 is, thus, caused to emit 50 microsecond bursts of acoustic energy spaced as will be described hereinafter.

Signals appearing across transducer 16 are supplied to the base electrode of an NPN transistor 102 through a capacitor 103. A diode is connected between the collector and base electrodes of transistor 102 which has its collector electrode connected to bus 93 through a resistor and its emitter electrode connected to ground. Transistor 102 and its associated components invert the signal produced by transducer 16 and supply the inverted signal through a capacitor 104 to pin 12 of an integrated circuit AM receiver 105, such as a TCA440 receiver produced by Signetics, Inc.

Receiver 105 includes an amplifier with variable gain and a balanced detector. Gain is controlled by signals supplied to pins 3 and 9 which are connected to a gain control circuit comprising a NOR gate 106, a transistor 107, a diode 108, resistors 109 and 110, and a capacitor 111. Transistor 107 is connected through its emitter and collector electrodes in series with diode 108 and resistors 109 and 110 between positive voltage bus 93 and ground. Capacitor 111 is connected in parallel with series connected resistors 109 and 110. The input terminals of NOR gate 106 are connected to pin 8 of oscillator 94. Pins 3 and 9 of receiver 105 are connected to the junction between resistors 109 and 110.

The gain control circuit operates such that it supplies a signal to receiver 105 which substantially reduces the gain of the amplifier therein during and for a short while after each drive signal burst supplied to transducer 16. The length of the period after the end of the drive signal burst during which receiver gain is reduced is determined in part by capacitor 111. This period is set sufficiently long to cover any ringing interval of transducer 16. Thus, signals transmitted by transducer 16 and caused by ringing of the transducer are prevented from being passed to circuitry following receiver 105.

The output signal from the balanced detector in receiver 105 is produced on pins 15 and 16 which are connected through resistors to the input terminals of a differential amplifier 112. The noninverting input terminal of amplifier 112 is also connected through a resistor to the output terminal of a differential amplifier 114 which produces a stable reference voltage. Amplifier 112 functions to provide a test whereby the output signal of receiver 105 is deemed valid only if its magnitude exceeds a noise floor established by amplifier 114.

The output signal of amplifier 112 is supplied through a resistor to the noninverting input terminal of a differential amplifier 116 whose inverting input terminal is connected through a resistor to the output terminal of amplifier 114. The noninverting input terminal of amplifier 116 is connected to ground through a capacitor and its output terminal is connected to its inverting input terminal through a resistor so as to form an averaging detector. The values of the resistor and capacitor connected to the noninverting input terminal of amplifier 116 are chosen to provide an averaging period at least as long as a complete operating cycle of the range finder.

An average reference level signal is produced at the junction between the resistor and capacitor connected to the noninverting input terminal of amplifier 116.

The output terminal of amplifier 112 is also connected to the noninverting input terminal of a comparator 120 whose inverting input terminal is connected to the output terminal of amplifier 116. Comparator 120 produces a high output signal only if the output signal of receiver 105 passes both the noise floor and average level tests.

The junction between the resistor and capacitor at the noninverting input terminal of amplifier 116 is connected to the inverting input terminal of a comparator 118 whose noninverting input terminal is connected to a resistive voltage divider between voltage bus 93 and ground. Comparator 118 produces a high output signal except when the average signal level exceeds a noise ceiling indicative of an excessively noisy environment and system operation.

The output signal of amplifier 112 is also supplied to a peak detector comprising differential amplifiers 122 and 124, a diode 126 and a capacitor 128. Specifically, the output signal of amplifier 112 is supplied to the noninverting input terminal of amplifier 122 whose output terminal is connected through diode 126 to one plate of capacitor 128 and to the noninverting input terminal of amplifier 124. The other plate of capacitor 128 is connected to ground. The junction between diode 126 and capacitor 128 is connected to the inverting input terminal of amplifier 122. Also, the output terminal of amplifier 124 is connected to its inverting input terminal. A peak reference level signal is produced at the junction between diode 126 and capacitor 128.

The output signal of amplifier 124 is supplied through a resistor to the inverting input terminal of a comparator 130 which is also connected to amplifier 114 through a resistor. The noninverting input terminal of comparator 130 is connected to receive the output signal of amplifier 112. Comparator 130 thus compares the level of the output signal of receiver 105 with a peak reference level established by the peak detector, and produces a high output signal only if the receiver output signal level exceeds a predetermined fraction of the peak reference level.

The output terminals of comparators 120 and 130 are connected to a conductor 131 which is connected to positive voltage bus 93 through a resistor 134 whereby the conductor is biased to a positive voltage. However, comparators 120 and 130 are of a common collector configuration which effectively exhibits a grounded output when the the signal level at the noninverting input terminal is lower than that at the inverting input terminal. Thus, a positive signal (waveform D) appears on conductor 131 only if the output signals of both comparators 120 and 130 are high, indicating that a received echo has passed all of the noise floor, average level and peak level tests.

A first input terminal of an exclusive OR gate 135 is connected to conductor 131, and the output terminal of gate 135 is connected to pin 2 of an integrated circuit counter 136, such as a Model 4520 counter commercially available from Motorola, Inc. or National Semiconductor Corporation. Pin 12 of the counter is connected to a second input terminal of gate 135. A NOR gate 137 has a pair of input terminals connected to conductor 131 and pin 12 of counter 136 respectively and an output terminal connected to provide a reset signal for the counter. When so connected counter 136 effectively delays the signal supplied to pin 2 for a predetermined time period. The delay period is selected to be approximately the duration of the transmitted acoustic pulses (50 microseconds).

In the event that the signal on conductor 131 is of at least the duration established by counter 136, a delayed replica of the signal is produced on pin 12 (waveform E). This signal is supplied to one input terminal of an exclusive OR gate 138 which is interconnected with a flip-flop 139 to provide an output spike signal (waveform F) at each transition of the input signal. Thus, gate 138 and flip-flop 139 form an edge detector.

The edge detector output signal forms the clock signal for a counter or decoder 140 which produces sequential output pulse signals on pins 2 (waveform G), 10 and 6 (waveform I) in response to the clock signals. More specifically, the first clock signal produces the leading edge of a pulse on pin 2 which remains until the second clock signal. The fourth clock signal produces the leading edge of a pulse on pin 10 which remains until the fifth clock signal. The seventh clock signal produces the leading edge of a pulse on pin 6 which remains until the eighth clock signal. In the event that additional clock signals are generated during an operating cycle due to noise or multipath reflections, operation of counter 140 is stopped after the tenth clock signal by an output pulse produced on pin 11 and supplied to pin 13. Counter 140 may comprise a Model 4017 counter/decoder commercially available from Motorola, Inc. or National Semiconductor Corporation.

In operation, reflection of a first acoustic burst from reference target 22 results in a signal on pin 2 of counter 140 starting 50 microseconds after receipt of the leading edge of the reflection. The signal on pin 2 is supplied to one input terminal of a NOR gate 141 which functions as a gate combiner. The low output signal from gate 141 resulting from a pulse on pin 2 of counter 140 triggers transmission of the second acoustic energy burst in the burst pair.

Because of operation of the gain control circuit connected to pins 3 and 9 of receiver 105, transmission of the second burst cuts off reception of the reflection of the first burst (first pulse in waveform B), which is prolonged due to ringing of the transducer. Thus, the signals of waveforms D–G resulting from reflection of the first burst from the reference target are limited to 50 microseconds duration, whereas the signals resulting from the remaining reflections during an operating cycle are not subject to the same limitation.

Reference numeral 142 identifies a phase detector and voltage controlled oscillator, such as a Model CD4046 voltage controlled oscillator available from National Semiconductor Corporation. By means of connections to pins 6, 7, 11 and 12, oscillator 142 is set to produce an output pulse train on pin 4 at a predetermined nominal frequency. This pulse train forms the clock signal for delay counter 136 and for a reference counter formed of integrated circuit counters 143 and 144. In turn, counter 143 provides the clock signal for a gate counter or decoder 145.

The output frequency of oscillator 142 is, however, variable depending on the phase relationship of signals supplied to pins 3 and 14. If the leading edges of the signals supplied to these pins do not coincide a voltage is produced on pin 13. This voltage may be supplied to pin 9 through an electronic switch 146, thereby varying the oscillator output frequency. Switch 146 is controlled by the output signal of comparator 118 which establishes the noise ceiling. The output signal of comparator 118 is high as long as excessive noise is not present, thus permitting oscillator 142 to adjust its output frequency. However, if the received noise level becomes excessive, switch 146 disconnects pins 9 and 13, and the oscillator runs free at its last previous frequency.

Gate counter 145, which may comprise an integrated circuit counter similar to counter 140, receives its clock signal from pin 5 of counter 143. This clock signal is a pulse train which may have a 50 microsecond repetition rate. A pulse signal is produced on pin 9 of counter 145 at the expected time of a pulse signal on pin 2 of edge counter 140 resulting from reception of a reflection of the first acoustic burst from the reference target. The signal on pin 9 of counter 145 thus simulates the timing of the first reference echo. The output frequency of oscillator 142 varies as previously described to keep the simulated timing in agreement with the actual timing of the first reference echo. This insures that the range finder remains calibrated for correctly determining distance to a target object.

The reset signals for reference counters 143 and 144, as well as the other circuit components requiring reset signals, are produced by a NOR gate 148, OR gates 149 and 150, flip-flops 151 and 152 and a diode 153. System reset occurs either when an operating cycle is complete or when excessive noise is received.

In addition, the reference counters and peak detector are reset by the trailing edge of the edge counter output signal resulting from receipt of the second reference echo. This effectively delays operation of the reference counters for range detection purposes for a period of time equal to the round trip acoustic signal travel time between transducer 16 and reflector 20. Thus, the count accumulated by the reference counters is indicative of only the distance between the reflector on the range finder housing and the target object. With regard to peak detector operation, this reset insures that the peak reference level is set by a target object echo rather a reference target echo.

One principal input signal for the reset circuitry is provided by comparator 118 which establishes the noise ceiling. This signal is supplied to both input terminals of NOR gate 148 whose output terminal is connected to one input terminal of OR gate 149. The other input terminal of gate 149 is connected to pin 4 of reference counter 144 on which is produced a signal pulse at a time corresponding to a target object range greater than the maximum operating range of the range finder. The output terminal of gate 149 supplies the reset signals for edge counter 140 and gate counter 145, and is also connected to one input terminal of OR gate 150 which supplies the reset signal for reference counters 143 and 144.

Flip-flop 152 provides for generation of the reset signal at termination of the second reference echo. The reset terminal of flip-flop 152 is connected to the output terminal of gate 150, its Q output terminal is connected to a second input terminal of gate 150 and its clock terminal is connected to pin 10 of edge counter 140. This arrangement results in generation of a reset signal in response to the trailing edge of the output signal pulse on pin 10 of the edge counter, which pulse corresponds to the second reference echo.

The output terminal of gate 150 is connected to flip-flop 151. A high output signal from gate 150 results in a low signal at the $\overline{Q}$ output terminal of the flip-flop. This causes the voltage on capacitor 128 in the peak detector to bleed off through diode 153 and the resistor connected thereto. Accordingly, the peak detector circuit is reset to a condition in which it can establish a new peak level. Flip-flop 151 is reset by the signal on pin 11 of counter 143.

The signal on pin 11 of counter 143 also comprises a clock signal for a flip-flop 154 whose D input terminal is connected to pin 6 of edge counter 140 from which it receives a signal (waveform I) which causes a high signal at its Q output terminal upon validation of a second echo from a target object. This signal comprises a latch signal for integrated latch circuits 155 and 156 which receive the counts in reference counters 143 and 144 respectively.

The binary count in latch circuits 155 and 156 is converted to an analog signal indicative of range to the target object by means of a ladder circuit 157. The analog output signal of ladder circuit 157 is provided on pin 16 which is connected through a resistor network to the noninverting input terminal of an output amplifier 160 whose output terminal is connected to ground through a potentiometer. The wiper of the potentiometer is connected to a range output pad 161.

The output signal on pin 9 of gate counter 145 (waveform H) is supplied to a proximity latch comprising interconnected flip-flops 164 and 165. Specifically, the signal on pin 9 comprises the reset signal for flip-flop 164 and the clock signal for flip-flop 165. Receipt of a set signal by flip-flop 164 from edge counter 140 results in a high output signal at the Q output terminal of flip-flop 165. This signal forms the control signal for a transistor 166 which drives a light emitting diode 167 to indicate that a target object has been sensed.

The signal on pin 11 of reference counter 144 is supplied to both inputs of a NOR gate 170 whose output terminal is connected to the clock terminal of a counter 171 similar to counters 140, and 145. The output signal on pin 9 of gate counter 145 also comprises the reset signal for counter 171. Counter 171 defines a time window after return of the first echo from the reference target during which determination of target object range is not possible. The time window corresponds to the target object being closer to the range finder than a minimum range detection distance.

The output signal on pin 2 of counter 171 is supplied to a too close latch comprising interconnected NAND gates 172-175. Specifically, pin 2 of counter 171 is connected to one input of NAND gate 172, the other input of which is connected to conductor 131. Thus, after receipt of an echo which passes the first noise floor, average level and peak level tests, the output signal of NAND gate 172 remains low until the gate receives a signal from counter 171. During this time the latch supplies a signal to the D terminal of a flip-flop 176 which results in a high signal at the Q output terminal thereof. The signal at the Q output terminal forms the control signal for a transistor 177 which drives a light emitting diode 178. If the target object is too close for range measurement no output signal is produced on pin 2 of counter 171 and diode 178 remains illuminated.

The $\overline{Q}$ output terminal of flip-flop 165 and the Q output terminal of flip-flop 176 are connected to the input terminals of a NOR gate 180 whose output terminal is connected to a display enable pad 181. A signal is available at pad 181 only when a target object has been detected and it is sufficiently far from the range finder to permit a range measurement.

The Q and Q̄ output terminals of flip-flop 165 are connected to terminals of a switch 182 which permits one or the other of the signals on the Q and Q̄ output terminals to be supplied to the base of an NPN transistor 183 which produces a signal at a relay pad 184. Switch 182 permits a signal for actuating a relay to be provided either when a target object is present, or when it is absent, as desired.

In accordance with the foregoing description, the applicant has provided a single transducer, pulse transmission ultrasonic range finder which provides automatic self-compensation for variations in distance determinations due to variations in acoustic propogation velocity between the range finder and the target object. A specific embodiment has been shown and described in detail for illustrative purposes. However, a number of modifications and variations which do not depart from the applicants' contemplation and teaching will be apparent to those of ordinary skill in the relevant arts. It is not intended that coverage be limited to the disclosed embodiment, but only by the terms of the following claims.

The embodiments of the invention in which an exclusive property or right is claimed are defined as follows:

1. An ultrasonic sensor comprising:
    transducer means including an electroacoustic transducer for transmitting burst of acoustic energy along a predetermined path in response to electrical drive pulses and converting echoes of the transmitted burst into corresponding electrical signals;
    a reference target located in the predetermined path closer to said transducer means than any intended target object for reflecting a portion of the acoustic energy transmitted by said transducer means back toward said transducer means;
    transmit circuitry having a control terminal, said transmit signal circuitry being operable in response to a first signal at the control terminal to supply a first electrical drive pulse to said electroacoustic transducer so as to cause it to transmit a first burst of acoustic energy;
    receiver circuitry connected to receive electrical signals produced by said electroacoustic transducer, said receiver circuitry being operable to supply a second signal to the control terminal of said transmit circuitry in response to to receipt by said transducer means of an echo from said reference target of the first burst of acoustic energy, thereby causing said transmit circuitry to supply a second electrical driver pulse and said transducer means to transmit a second burst of acoustic energy, said receiver circuitry including a peak detector operable to establish a peak reference level in response to a first echo signal resulting from receipt of an echo of the first burst of acousitic energy from a target object, said receiver circuitry further including comparator means operable to pass a second echo signal resulting from receipt of an echo of the second burst of acoustic energy from the target object if the level of the second echo signal exceeds a predetermined fraction of the peak reference level;
    oscillator means for producing periodic clock signals;
    counter means operable to accumulate a first count of the clock signals occurring during a time interval commencing at a predetermined time relative to transmission of the second burst of acoustic energy and ending at a predetermined time relative to receipt of the second echo provided that the second echo signal is passed by said comparator means; and
    output means connected to said counter means for producing an indication of distance to the target object based on the first count of clock signals.

2. The ultrasonic sensor of claim 1 wherein:
    the first drive pulse supplied by said transmit circuitry is characterized to cause the first burst of acoustic energy transmitted by said electroacousitic transducer to be of a predetermined duration; and
    said transmit circuitry is operable to supply the second drive pulse only after an echo of the first burst which exceeds the predetermined duration is received.

3. The ultrasonic sensor of claim 2 wherein:
    said receiver circuitry includes an averaging detector operable to establish an average reference level in response to the electrical signals produced by said electroacoustic transducer; and
    said comparator means is operable to pass the second echo signal only if its level exceeds the average reference level and a predetermined fraction of the peak reference level.

4. The ultrasonic sensor of claim 3 wherein:
    said counter means is further operable to produce a proximity signal when it reaches a second count indicative of a minimum target distance at which range can be measured; and
    latch means is provided, said latch means being responsive to the proximity signal and operable to provide an output signal indicating that the target object is too close for a range measurement until the count of clock signals advances to the second count.

5. An ultrasonic sensor comprising:
    an electrocousitc transducer adapted to transmit burst of acoustic energy along an acoustic path in response to electrical drive pulses and to convert acoustic energy received from targets in the acoustic path to corresponding electrical echo signals;
    a reference target located in the acoustic path closer to said elctroacoustic transducer than any intended target object;
    transmit/receive circuitry operable to supply a first electrical drive pulse to said elctroacoustic transducer for causing it to transmit a first burst of acoustic energy, said transmit/receive circuitry responding to receipt by said electroacoustic transducer of an echo of the first burst of acoustic energy from said reference target by supplying a second electrical drive pulse to said electroacoustic transducer for causing it to transmit a second burst of acoustic energy, said transmit/receive circuitry further being operable to receive from said electroacoustic transducer corresponding first and second echo signals due to echoes of the first and second bursts of acoustic energy from a target object in the acoustic path said transmit/receiver circuitry includes means for using the first echo signal to establish validity criteria for the second echo signal;
    an output circuit connected to said transmit/receive circuitry and operable to indicate presence of a target object in response to the second echo signal provided that the second echo signal meets validity criteria established in response to the first echo signal.

6. The ultrasonic sensor of claim 5 wherein said transmit/receive circuitry includes:
a peak detector operable to establish a peak reference level based on the level of the first echo signal; and
comparator means operable to compare the level of the second echo signal with the peak reference level and to supply a corresponding signal to said output circuit only if the level of the second echo signal exceeds a predetermined fraction of the peak reference level.

7. The ultrasonic sensor of claim 6 wherein:
said transmit/receive circuitry includes an averaging detector operable to establish an average reference level based on the average level of electrical signals produced by said electroacoustic transducer during an operating cycle; and
said comparator means is operable to compare the level of the second echo signal with the average reference level and supply said corresponding signal only if the level of the second echo signal exceeds the average reference level and a predetermined fraction of the peak reference level.

8. An ultrasonic sensor comprising:
an electroacoustic transducer adapted to transmit acoustic energy along an acoustic path in response to electrical drive signals and to convert reflections of the transmitted acoustic energy from objects in the acoustic path to corresponding electrical detection signals;
reflector means positioned to intercept at least a portion of the transmitted acousitc energy and redirect the intercepted acoustic energy toward a target area, said reflector further being operable to redirect at least a portion of the acoustic energy reflected from objects in the target area toward said transducer;
a reference target proximate said reflector means for reflecting a portion of the acoustic energy transmitted by said electroacoustic transducer back toward said electroacoustic transducer; and
transmit/receiver circuitry operble to supply a first electrical drive signal to said transducer whereby said transducer is caused to transmit a first burst of acoustic energy, said transmit/receive circuitry responding to receipt by said electroacoustic transducer of a reflection of the first burst of acoustic energy from said reference target by supplying a second electrical drive signal to said electroacoustic transducer for causing it to transmit a second burst of acoustic energy, said transmit/ receive circuitry further being operable to produce first and second echo signals in response to echoes of the first and second bursts of acoustic energy respectively from an object in the target area, said transmit/receive circuitry includes means for using the first echo signal to establish validity criteria for the second echo signal and to utilize the second echo signal to determine presence of the object provided that the second echo signal meets validity criteria established in response to the first echo signal.

9. The ultrasonic sensor of claim 8 wherein said transmit/receive circuitry includes:
an averaging detector operable to establish an average reference level in response to the first and second echo signals; and
first comparator means operable to provide an output signal permitting determination of presence of the object only if the level of the second echo signal is higher than the average reference level.

10. The ultrasonic sensor of claim 9 wherein:
a peak detector operable to establish a peak reference level based on the first echo signal is included; and
second comparator means operable to permit a determination of presence of the object only if the level of the second echo signal exceeds the average reference level and peak reference level.

11. A method of ultrasonically determining distance between an electroacoustic transducer and a target object, comprising the steps of:
transmitting a first burst of acoustic energy along an acoustic path toward the target object;
locating a reference target in the acoustic path between the electroacoustic transducer and the target object;
transmitting a second burst of acoustic energy along the acoustic path in response to receipt at the electroacoustic transducer of a reflection of the first burst of acoustic energy from the reference target;
establishing validity criteria from reflections of the first burst of acoustic energy from the target object; and
determining distance to the target object from the time required for reflections of the second burst of acoustic energy to return from the target object, the distance being determined only if the reflectons of the second burst of acoustic energy from the target object meet the validity criteria.

12. The method of claim 11 comprising the further steps of:
establishing a peak reference level based on the level of the reflection of the first burst of acoustic energy from the target object; and
determining distance to the target object only if the level of the reflection of the second burst of acoustic energy from the target object exceeds a predetermined fraction of the peak reference level.

13. The method of claim 12 comprising the further steps of:
establishing an average reference level based on the levels of reflections of the first and second bursts of acoustic energy from the target object during an operating cycle; and
determining distance to the target object only if the level of the reflection of the second burst of acoustic energy from the target object exceeds the average and peak reference levels.

* * * * *